United States Patent
Kumagai et al.

(10) Patent No.: US 8,516,712 B2
(45) Date of Patent: Aug. 27, 2013

(54) MEASUREMENT DEVICE

(75) Inventors: Hideki Kumagai, Utsunomiya (JP); Kazumi Mizukami, Moka (JP)

(73) Assignee: Mitutoyo Corporation, Kanagawa (JP)

( * ) Notice: Subject to any disclaimer, the term of this patent is extended or adjusted under 35 U.S.C. 154(b) by 241 days.

(21) Appl. No.: 13/218,824

(22) Filed: Aug. 26, 2011

(65) Prior Publication Data
US 2012/0055037 A1    Mar. 8, 2012

(30) Foreign Application Priority Data
Sep. 3, 2010    (JP) ................................. 2010-197594

(51) Int. Cl.
  *G01B 5/008*    (2006.01)
(52) U.S. Cl.
  USPC ............................................................ 33/503
(58) Field of Classification Search
  USPC .................................................. 33/503, 556
  See application file for complete search history.

(56) References Cited

U.S. PATENT DOCUMENTS

| | | | | | |
|---|---|---|---|---|---|
| 4,335,517 | A | * | 6/1982 | James et al. ..................... | 33/503 |
| 6,044,569 | A | * | 4/2000 | Ogihara et al. .................. | 33/503 |
| 8,082,673 | B2 | * | 12/2011 | Desforges et al. .............. | 33/503 |
| 2011/0094117 | A1 | * | 4/2011 | Groell .............................. | 33/503 |
| 2012/0079731 | A1 | * | 4/2012 | Ruck ............................... | 33/503 |
| 2012/0291297 | A1 | * | 11/2012 | Ferrari ............................ | 33/503 |
| 2013/0025143 | A1 | * | 1/2013 | Bailey et al. .................... | 33/503 |

FOREIGN PATENT DOCUMENTS
JP    2001-21303    1/2001

* cited by examiner

*Primary Examiner* — G. Bradley Bennett
(74) *Attorney, Agent, or Firm* — Greenblum & Bernstein, P.L.C.

(57) ABSTRACT

A three-dimensional measuring machine (measurement device) which supplies a probe having a measurement head able to make contact with a measured object and a contact detection sensor which detects the contact of a measurement head with a measured object and outputs a touch signal; a displacement structure which displaces a probe along three axial directions orthogonal to one another; scale sensors which detect the position coordinates of a probe and output a coordinate detection signal; a control circuit board having an integrated circuit on which are installed a touch counter which counts touch signals and a scale counter which counts coordinate detection signals; and a latch controller which latches a touch counter value and a scale counter value at the same time.

2 Claims, 3 Drawing Sheets

MEASUREMENT DEVICE

CROSS-REFERENCE TO RELATED APPLICATIONS

The present application claims priority under 35 U.S.C. §119 of Japanese Application No. 2010-197594 filed on Sep. 3, 2010, the disclosure of which is expressly incorporated by reference herein in its entirety.

BACKGROUND OF THE INVENTION

1. Field of the Invention

The present invention relates to a measurement device having a probe which makes contact with a measured object and having a displacement structure which is capable of displacing the probe in a predetermined axial direction.

2. Description of Related Art

Conventionally, measurement devices such as a three-dimensional measuring machine have been known which measure the shape or the like of a measured object by displacing a probe along an axial direction (XYZ axis directions) and bringing a measurement head provided on the probe into contact with the measured object (see for example Japanese Patent Laid-Open Publication No. 2001-21303). Measurement devices of this type are normally provided with a scale circuit having a scale counter to detect the position to which the probe has been displaced in an axial direction and a probe circuit having a touch counter to detect the contoured state of the measured object when the probe's measurement head has made contact with the object. Normally the probe is provided so as to be interchangeable and, because the probe circuit provided with a touch counter is also exchanged when the probe is exchanged, the probe circuit and scale circuit are provided as separate bodies.

SUMMARY OF THE INVENTION

In the conventional measurement devices described above, a latch on the scale counter and a latch on the touch counter are implemented by software. FIG. 4 is a diagram showing the latch timing of a scale counter and the latch timing of a touch counter in a conventional measurement device. In the conventional measurement devices described above, when the latch for each counter is engaged by software, it is necessary to read the register controlling the circuit provided with the scale counter and to read the register controlling the circuit provided with the touch counter. For this reason, due to a difference in read times for these registers, as shown in FIG. 4, a time lag would arise between the latch timing of the scale counter and the latch timing of the touch counter. When such a time lag occurs, there are phenomena such as the processing time for carrying out a measurement process growing longer, or that reliability of a read coordinate value may decline due to the latch timing of the scale counter and the latch timing of the touch counter differing.

In light of the phenomena described above, the present invention provides a measurement device which is able to achieve improvement in the reliability of a read coordinate value and to accelerate latch processing.

A feature of the present invention is a measurement device having a probe which has a measurement head able to make contact with a measured object, and a contact detector that detects the contact of the measurement head with the measured object and outputs a touch signal; a displacer which displaces the probe along three axial directions orthogonal to one another; a coordinate detector which detects a position coordinate of the probe and outputs a coordinate detection signal; a control circuit board which has an integrated circuit on which are installed a touch counter which counts the touch signal and a scale counter which counts the coordinate detection signal; and a latch which latches the touch counter value and the scale counter value at the same time.

In the invention, the touch counter which counts the touch signal which detects the contact state (contoured state) of the measurement head of the probe with the measured object and the scale counter which counts the coordinate detection signal output from the coordinate detector are installed within a single integrated circuit, provided within the control circuit board which constitutes the measurement device. Here, the touch counter and the scale counter are installed within a single integrated circuit on the control circuit board. Therefore, when latch control is performed by software, for example, the latch control on each register may be omitted and the latching of the touch counter count value and the latching of the scale counter count value may be activated at the same time. Accordingly, measurement processing speed may be improved and also the position coordinates of the probe in the moment of contact of the measurement head with the measured object may be measured, and measurement accuracy may be improved.

In the measurement device of the present invention, it is preferable that the probe be provided so as to be interchangeable with other probes which differ in their signal format for the touch signal which is output from the contact detector; that in response to a plurality of touch signals which differ in their signal format, the control circuit board be provided with a plurality of connectors able to input each of the touch signals; and that the integrated circuit have a plurality of touch counters corresponding to a plurality of touch signals which differ in their signal format.

In measurement devices, when the probe is provided so as to be interchangeable in accordance with the shape of the measured object and another probe is exchanged, the signal format of the touch signal output by the contact detector may also change. In such a case, conventionally, it was necessary to change the circuit containing the counter which counts the touch signals sent from the probe as well, which involved complicated labor. In contrast, in the present invention, the integrated circuit provided on the control circuit board is fitted with a plurality of touch counters corresponding to a plurality of touch signals which differ in their signal format. Further, when the probe is exchanged for another probe which outputs a touch signal of a different signal format, the connector shape may also have a different shape; however, the control circuit board is provided with a plurality of connectors corresponding to the touch signals of different signal formats. In a structure such as in the present invention, even when the probe is exchanged for a probe of a different type, the touch signal may be output to the control circuit board by the probe connecting to the connector which corresponds to the signal format of the exchanged probe. In the integrated circuit of the control circuit board, since a plurality of touch counters are provided corresponding to a plurality of signal formats, even when the probe is exchanged, the touch signal may be processed without exchanging the integrated circuit or the like. Therefore, it is possible to lessen the labor involved in exchanging the probe in the measurement device.

In the present invention, because the touch counter and the scale counter are both installed on a single integrated circuit, the measurement device is able to shorten the read time of the registers and is able to make the latch processing of the touch counter count value and the latch processing of the scale counter count value simultaneous. Accordingly, the measurement processing time may be shortened and measurements may be carried out with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
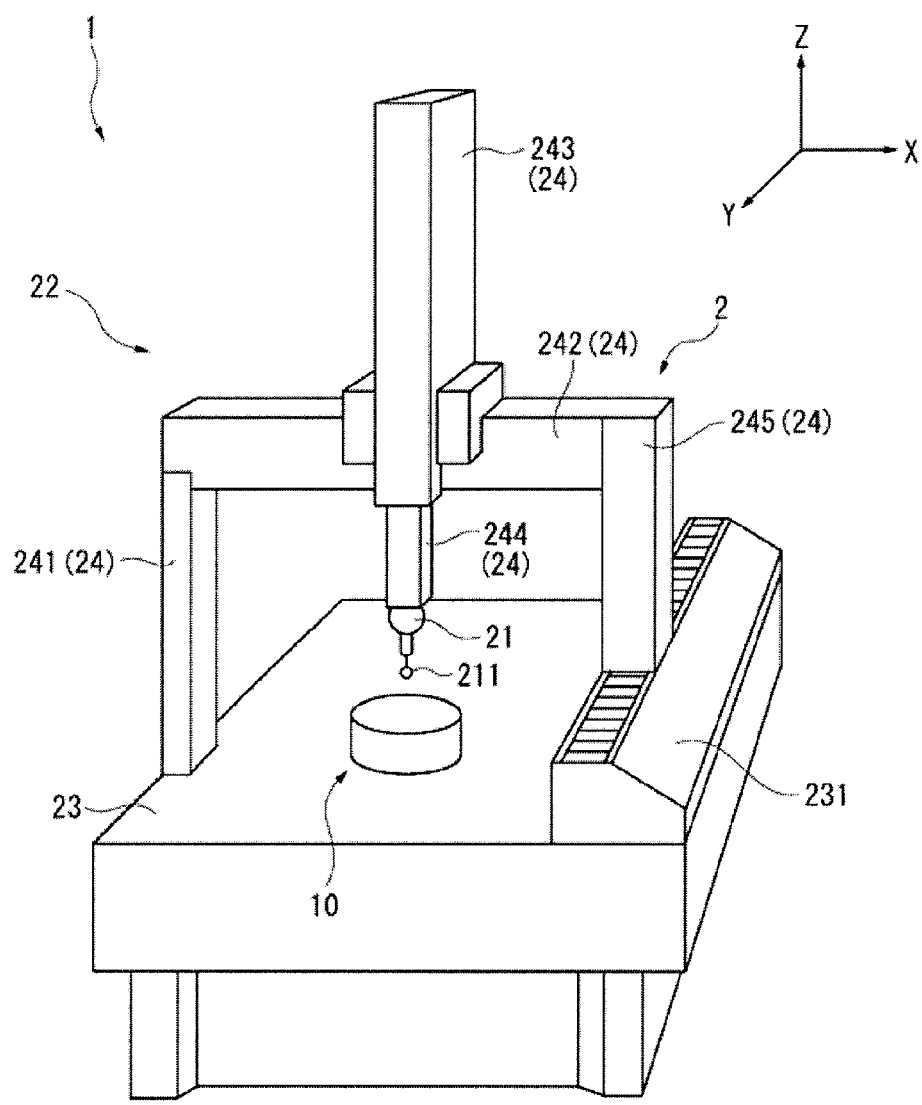
FIG. 1 illustrates an overview structure for a three-dimensional measuring machine (measurement device) according to one embodiment of the present invention.
Figure 2:
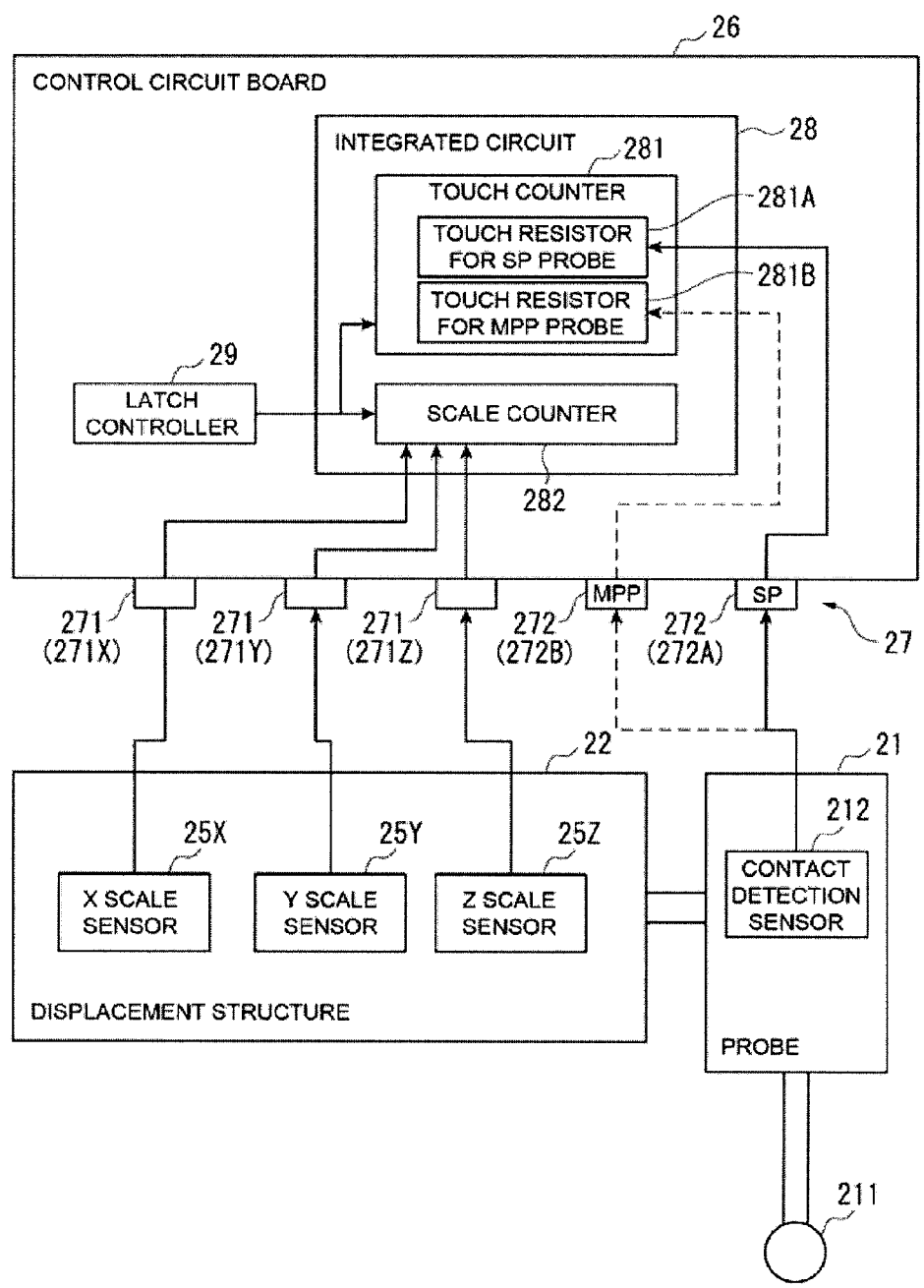
FIG. 2 is a block diagram illustrating an overview structure for the control circuit board installed on the device body of the embodiment.

Hereafter, a three-dimensional measuring machine (measurement device) according to one embodiment of the present invention is described based on the figures. Hereafter, an embodiment of the present invention is described based on the figures. FIG. 1 illustrates an overview structure for the three-dimensional measuring machine, which is industrial machinery in one embodiment of the present invention. FIG. 2 is a block diagram illustrating an overview structure for the control circuit board installed on the device body of the embodiment.

In FIG. 1, the three-dimensional measuring machine 1 (measurement device) is provided with a device body 2 and a control device (not shown) which inputs measurement result data output from a drive control of the device body 2 or from the device body 2. The control device is configured with a motion controller which controls the movement of the device body 2, a host computer which activates each type of processing, such as measurement result tabulation, and the like. The motion controller is provided with an operator in which an operating signal is input through control by a user, and which controls a driver of the device body 2 based on the operating signal input from the operator or based on a control signal input from the host computer. A host computer performs data tabulation based on measurement result data measured by the device body 2, generates image data for a measured object 10 from measurement result data, and the like.

The device body 2 has a measurement head 211 which is brought into direct contact with the surface of the measured object 10, and is provided with a probe 21 which measures the measured object 10; a displacement structure 22 which displaces the probe 21 while also retaining a base end side (+Z-axis direction side) of the probe 21; a base 23 on which the displacement structure 22 is erected; and a control circuit board 26 provided within the device body 2 (see FIG. 2).

The probe 21 is provided with a contact detection sensor 212 (contact detector) which detects contact pressure when the measurement head 211 makes contact with the measured object 10, and outputs a touch signal to the control circuit board 26. For example, the contact detection sensor 212 outputs a touch signal having a level value corresponding to the contact pressure when the measurement head 211 makes contact with the measured object 10. The probe 21 is further provided to be freely attachable and detachable from the displacement structure 22 and may be exchanged, for example, depending on the variety of the measured object 10 or the measurement location. Here, a probe for gauging screw depth, a probe with a longer stylus length than others, a low measurement pressure probe, or the like, are examples of the interchangeable probe 21. It is also possible to exchange the probe for a probe having a different signal format of a touch signal output from the contact detection sensor 212. When the signal format of the touch signal differs, the shape of a contact connector between the probe 21 and the control circuit board 26 also differs; however, a plurality of connectors are provided on the control circuit board 26 corresponding to a plurality of signal formats for the touch signal and it becomes possible to input the touch signal to the control circuit board 26 by connecting the probe to the corresponding connector. In the present embodiment, depending on the difference in signal format of the touch signal and taking the example of an SP-type probe and an MPP-type probe, examples are provided wherein an SP connector 272A is provided to connect an SP-type probe and an MPP connector 272B is provided to connect an MPP-type probe.

The displacement structure 22 (displacer) is provided with a slide structure 24 which, along with retaining the base end side of the probe 21, enables the sliding displacement of the probe 21; and a drive structure (not shown) which displaces the probe 21 by driving the slide structure 24.

The slide structure 24 is provided with a column 241 which extends in a +Z-axis direction from both X-axis direction ends on the base 23 and is provided slide-displaceably along a Y-axis direction on a guide 231 which is provided along the Y-axis direction; a beam 242 supported by the column 241 and extending along the X-axis direction; a slider 243 formed in a cylindrical shape extending along a Z-axis direction and provided slide-displaceably over the beam 242 along the X-axis direction; and a ram 244 which, along with being inserted into the interior of the slider 243, is provided slide-displaceably along the Z-axis direction through the interior of the slider 243. The slide structure 24 is further provided with a supporter 245 extending along the Z-axis direction on the end of a +X-axis direction side on the beam 242.

The drive structure, along with supporting the column 241, is provided with a Y-axis driver (not shown) which slide-displaces along the Y-axis direction; an X-axis driver (not shown) which displaces the slider 243 along the X-axis direction by sliding over the beam 242; and a Z-axis driver (not shown) which displaces the ram 244 along the Z-axis direction by sliding through the interior of the slider 243. These drive structures are each provided with a drive motor (drive source) not shown and a drive transmission structure which transmits a drive force supplied from the drive motor to the slide structure 24. These drive structures slide-displace, respectively, the column 241, the slider 243, and the ram 244 with the drive force of the drive motor.

The device body 2 is further provided with a coordinate detector which detects the position in each axis direction of the column 241, the slider 243, and the ram 244. Specifically, a Y-axis scale (not shown) is provided along the Y-axis direction on the guide 231 and a Y-axis scale sensor 25Y (see FIG. 2) which reads the value of the Y-axis scale is provided on the column 241. An X-axis scale (not shown) is further provided along the X-axis direction on the beam 242 and an X-axis scale sensor 25X (see FIG. 2) which reads the value of the X-axis scale is provided on the slider 243. A Z-axis scale (not shown) is further provided along the Z-axis direction on the ram 244 and a Z-axis scale sensor 25Z (see FIG. 2) which reads the value of the Z-axis scale is provided within the slider 243 which holds the ram 244 displaceably in the Z-axis direction. Y-axis scale sensor 25Y, X-axis scale sensor 25X, and Z-axis scale sensor 25Z are respectively connected to scale connectors 271Y, 271X, and 271Z each provided on the control circuit board 26, and output a coordinate detection signal (Y coordinate detection signal, X coordinate detection signal, Z coordinate detection signal) to the control circuit board 26.

As shown in FIG. 2, the control circuit board 26 is configured by providing each type of a connector 27, an integrated circuit 28, a latch controller 29, and the like. The control circuit board 26 is further provided with a CPU (not shown) and memory (not shown), and the latch controller 29 is configured from this CPU and memory. That is, the latch controller 29 functions by reading and executing a program (software) which the CPU has saved in a memory.

Each type of the connector 27 is provided with a scale connector 271 and a probe connector 272. The scale connector 271 is provided with the X connector 271X which connects the X-axis scale sensor, the Y connector 271Y which connects the Y-axis scale sensor, and the Z connector 271Z which connects the Z-axis scale sensor. The X coordinate detection signal is input to the X connector 271X from the X scale sensor, the Y coordinate detection signal is input to the Y connector 271Y from the Y scale sensor, and the Z coordinate detection signal is input to the Z connector 271Z from the Z scale sensor. The inputted coordinate detection signals are input to a scale counter 282 which is installed on an FPGA 28.

The probe connector 272 is provided with an SP connector 272A and with an MPP connector 272B. The SP connector 272A is an element which connects the connector when an SP-type probe 21 is attached to the displacement structure 22, and inputs the touch signal output from the contact detection sensor 212 in the SP-type probe 21. An MPP connector 272B connects the connector when an MPP-type probe 21 is attached to the displacement structure 22, and inputs the touch signal output from the contact detection sensor 212 in the MPP-type probe 21.

The integrated circuit 28 is configured from an FPGA (Field-Programmable Gate Array) or ASIC (Application Specific Integrated Circuit) which allows the user to configure its structure. As shown in FIG. 2, the integrated circuit 28 is installed with a touch counter 281 and a scale counter 282. The touch counter 281 is provided with a touch register 281A for the SP probe which A/D converts the touch signal input from the SP connector 272A and latches the value, and a touch counter 281B for the MPP probe which counts the touch signal input from the MPP connector 272B. The scale counter 282 counts the coordinate detection signal input through the scale connector 271 from the X scale sensor 25X, the Y scale sensor 25Y, and the Z scale sensor 25Z.

Figure 3:
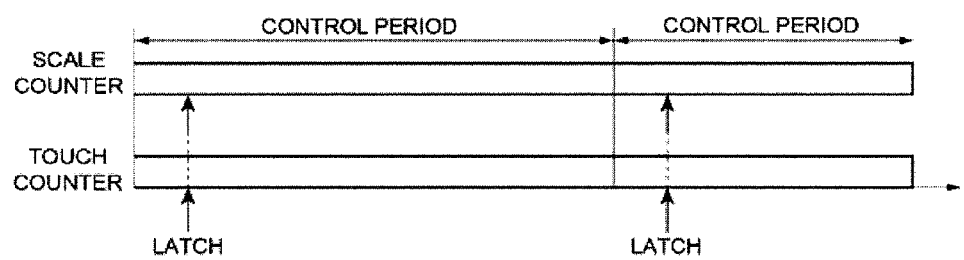
FIG. 3 illustrates latch timing in the embodiment.
Figure 4:
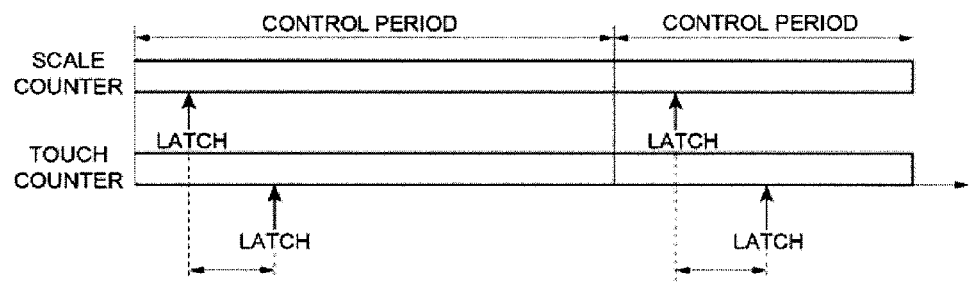
FIG. 4 illustrates latch timing in a conventional measurement device.

As described above, the latch controller 29 functions by the CPU reading software stored in the memory, and latches count values from the touch counter 281 and the scale counter 282. FIG. 3 shows latch timing for the touch counter and latch timing for the scale counter in the present embodiment. When a level value of the touch signal exceeds a predetermined defined value, the latch controller 29 latches the count value of the touch counter 281 and the count value of the scale counter 282 at the same time. Here, for example, when a circuit board provided with the touch counter and a circuit board provided with the scale counter are different boards, and when the latch is controlled by a software latch controller 29, the latch controller 29 must perform latch control after reading each register controlling each circuit board. In such a case, as shown in FIG. 4, in only the time for the register reading process, a lag arises between the latch timing of the touch counter and the latch timing of the scale counter. In contrast, in the present embodiment, because the touch counter 281 and the scale counter 282 are installed in a single integrated circuit 28, lags in latch timing due to differences in register reading times disappear. Accordingly, as shown in FIG. 3, it is possible to make the latch timing of the touch counter 281 and the latch timing of the scale counter 282 simultaneous. This means that it is possible to read the position coordinates of the probe 21 at the moment the measurement head 211 makes contact with the measured object 10 at a pressure greater than a defined value.

As described above, the device body 2 of the three-dimensional measuring machine 1 in the embodiment is provided with the probe 21 provided with the measurement head 211 and the contact detection sensor 212 which outputs a touch signal corresponding to the contact pressure when the measurement head 211 makes contact with the measured object 10; the displacement structure 22 which displaces the probe 21 along the XYZ-axis directions; and the scale sensor for each (25X, 25Y, 25Z) which detects a displacement position of the probe 21 in the XYZ-axis directions. The control circuit board 26 of the device body 2 is provided with the integrated circuit 28 on which are installed the touch counter 281 which counts the touch signal input from the contact detection sensor 212 and the scale counter 282 which counts the coordinate detection signal input from each of the scale sensors (25X, 25Y, 25Z). The latch controller 29 latches at the same time the count value from the touch counter 281 and the count value from the scale counter 282 installed on the integrated circuit 28. With such a structure, at the moment that the level of the touch signal exceeds a defined value, the latch controller 29 will latch the count value from the touch counter 281 and the count value from the scale counter 282. For this reason, because latch timing is simultaneous, the position coordinates of the probe at the moment the measurement head 211 makes contact with the measured object 10 may be measured correctly, and measurement accuracy may be improved. Further, because the touch counter 281 and the scale counter 282 are installed inside the integrated circuit 28, the amount of time it takes to latch the register of each may be shortened, so the time involved in the measurement process may be compressed and the measurement process may be executed rapidly.

The control circuit board 26 is provided with the SP connector 272A for an SP-type probe and the MPP connector 272B for an MPP-type probe, and the integrated circuit 28 on which are installed the SP probe touch register 281A which latches by A/D converting the touch signal used in the SP-type probe and the touch counter 281B for the MPP probe which counts the touch signal used in the MPP-type probe. For this reason, even when the probe 21 has been changed from an SP-type probe to an MPP-type probe, for example, exchange of the probe 21 may be carried out easily by simply connecting the exchanged probe 21 to the corresponding connector 272A or 272B, without exchanging the touch counter, the integrated circuit 28, the control circuit board 26, or the like.

The present invention is not limited to the form of the embodiment described above; it also includes the variants indicated below which are within the scope of achieving the object of the present invention.

For example, in the embodiment described above, an example was given of the latch controller 29 functioning via software. However, a structure providing a hardware latch controller or the like is also acceptable. In such a case, the structure may be the control circuit board 26 provided with a latch control circuit and the latch control circuit which latches count values from the touch counter 281 and the scale counter 282. Even in such a structure, the latch control circuit is able to make the moment of latching simultaneous for the count value from the touch counter 281 and the count value from the scale counter 282, and it is possible to achieve a similar effect to the embodiment described above.

The specific structure and procedure when embodying the present invention may be altered as appropriate to another structure besides these within the scope of achieving the object of the present invention.

A feature of the present disclosure may be employed in a measurement device which executes measurement processes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measurement device comprising:
    a probe comprising:
        a measurement head configured to contact a measured object; and
        a contact detector configured to detect the contact of the measurement head with the measured object, the contact detector further configured to output a touch signal;
    a displacer configured to displace the probe along three axial directions orthogonal to one another;
    a coordinate detector configured to detect a position coordinate of the probe, and further configured to output a coordinate detection signal;
    a control circuit board having an integrated circuit on which are installed a touch counter, the touch counter configured to count the touch signal and a scale counter, the scale counter configured to count a coordinate detection signal; and
    a latch configured to latch the touch counter value and the scale counter value at the same time.

2. The measurement device according to claim 1, wherein:
    the probe is interchangeable with a other probes, each of which differ in the signal format of the touch signal output from the contact detector;
    the control circuit board comprises a plurality of connectors configured to input each of the touch signals in response to a plurality of touch signals which differ in the signal format; and
    the integrated circuit has a plurality of touch counters corresponding to a plurality of touch signals which differ in the signal format.

\* \* \* \* \*